Nov. 10, 1953    J. J. MACKERT    2,658,222
YIELDABLE WIPING IMPLEMENT
Filed Feb. 20, 1948
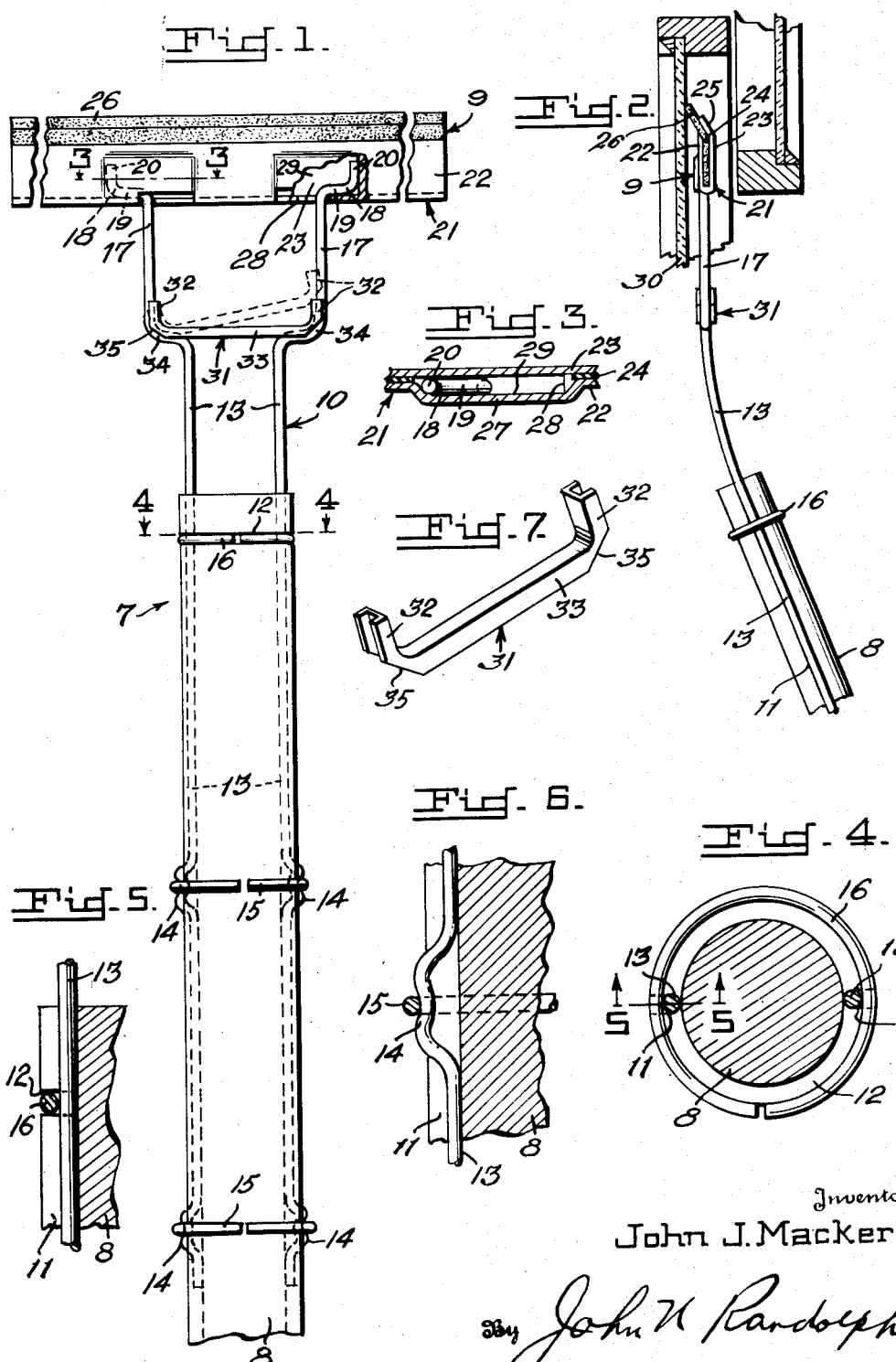
Inventor
John J. Mackert
By John K. Randolph
Attorney Patented Nov. 10, 1953

2,658,222

UNITED STATES PATENT OFFICE 2,658,222

YIELDABLE WIPING IMPLEMENT

John J. Mackert, Detroit, Mich.

Application February 20, 1948, Serial No. 9,813

3 Claims. (Cl. 15—245)

This invention relates to a yieldable implement especially adapted for use in wiping windows and other glass surfaces and more particularly has reference to an improved construction of shank for detachably and adjustably connecting a wiper head to a handle for resiliently supporting the wiper head relatively to the handle and whereby the resiliency between the head and handle may be varied at the will of the operator.

Another and important object of the invention is to provide an implement having a resilient shank capable of being readily applied to or removed from the implement head to enable a plurality of heads of different sizes and shapes to be demountably supported thereon.

Still another object of the invention is to provide an implement having means for supporting the wiper head thereof at a proper angle to facilitate the wiping operation and to enable the implement head to fit into restricted spaces and to yieldably bear against a surface to be wiped and at an angle thereto.

Various other objects and advantages of the invention will hereinafter become more fully apparent from the following description of the drawing, illustrating a presently preferred embodiment thereof, and wherein:

Figure 1 is a fragmentary bottom plan view of the implement;

Figure 2 is a fragmentary side elevational view thereof showing the implement in operation;

Figure 3 is an enlarged sectional view taken substantially along a plane as indicated by the line 3—3 of Figure 1;

Figure 4 is a cross sectional view taken substantially along a plane as indicated by the line 4—4 of Figure 1;

Figure 5 is a fragmentary longitudinal sectional view taken substantially along a plane as indicated by the line 5—5 of Figure 4;

Figure 6 is a view similar to Figure 5 but taken through another portion of the implement handle, and Figure 7 is a perspective view of one element of the implement.

Referring more particularly to the drawing, the novel yieldably wiping implement comprising the invention and which is designated generally 7 includes an elongated substantially straight handle 8 which may be of any desired length, a wiper head, designated generally 9 and a resilient shank, designated generally 10 for yieldably, detachably and adjustably connecting the handle 8 and head 9.

The handle 8 is preferably solid and of circular cross section and is provided at the shank end thereof with longitudinally extending corresponding grooves 11 which open outwardly of said shank end and which may extend any desired distance toward the opposite, grip end of the handle and which grooves 11 are formed in diagrammatically opposed portions of the handle 8, as best seen in Figure 4. The handle 8 is also provided with an annular groove 12 adjacent its shank end and which intersects with the grooves 11.

The shank 10 includes two corresponding elongated resilient rods each designated generally 13. The rods 13 have corresponding ends thereof slidably and removably disposed within the grooves 11 and each of said end portions is provided with one or a plurality of outwardly offset portions 14 the intermediate portion of each of which is inwardly bowed, as best seen in Figure 6. The portion or portions 14 of the rods 13 are disposed at corresponding points and said corresponding portions 14, which project from the grooves 11, are adapted to be engaged by split spring rings 15 which engage yieldably around the handle 8 and which frictionally clamp said aforementioned ends of the rods 13 in the grooves 11 but which will permit the shank 10 to be extended or retracted relatively to the handle 8 against the action of said springs 15 to vary the extent that said shank 10 projects from the handle 8 and accordingly to thereby vary the resiliency of said extended portion. A split spring ring 16, of slightly smaller diameter than the rings 15, is disposed in the groove 12 and engages the rods 13 for holding the portions of the rods 13, located adjacent the shank end of the handle 8 properly positioned within the grooves 11 and to prevent disengagement of the shank 10 from the handle 8 without first removing said spring ring 16, since the rings 15 and the rod portions 14 will afford obstructions which cannot pass said ring 16 in extending the shank 10.

The rods 13, adjacent their opposite ends, are provided with outwardly offset portions 17 which terminate in terminals 18. Said rod terminals 18 each include an outwardly projecting portion 19 which projects laterally outward from its rod portion 17 and an end portion 20 which is outwardly offset relatively to its end portion 17.

The implement head 9 includes a body portion, designated generally 21 formed from an elongated strip which is folded upon itself to form the spaced inner and outer walls 22 and 23, respectively, between which is clamped a blade 24 of the head 9 and which is preferably formed from a strip of rubber. As best seen in Figure 2, the outer wall 23 is wider than the inner wall 22 and the free edge thereof is bent to provide an oblique flange 25 which extends across the plane of the inner wall 22 and which causes the outer surface engaging edge portion 26 of the blade 24, which protrudes to beyond the edge of said flange 25 to likewise be disposed at an oblique angle to the plane of the head 9, as seen in Figures 2 and 3.

The inner wall 23 is provided with longitudinally spaced pressed out portions 27 and the bend of the strip forming the body of the head 21 is provided with cut-outs forming elongated longitudinally disposed openings 28 (Figure 3) one of which communicates with each head recess 29 formed by each pressed out portion 17. The blade 24 is recessed around the recesses 29 so that one of the shank portions 18 can be readily accommodated in each of said recesses. The shank portions 17 are pressed toward one another so that the terminals 18 may pass through the openings 28 into recesses 29. Portions 17 are then released and will assume the positions of Figures 1 and 3 due to the resiliency of the shank 10 and in which position the portions 19 will engage against the bottoms of the recesses 29 outwardly of the openings 28 to detachably retain the head 9 non-rotatably mounted on the shank 10 and with the plane of said head disposed substantially parallel to the plane of the shank 19 and the axis of the handle 8.

From the foregoing it will be readily apparent that the terminal portions 18 will slidably but non-rotatably engage in the recesses 29 so that the rods 13 can be sprung toward one another for readily disengaging terminals 18 from said recesses and thereby from the head 9 but when engaged therewith, as illustrated in Figure 1, the head will be disposed to properly engage against a window pane or like surface to be wiped thereby, as indicated at 30 in Figure 2 and so that with the plane of the head 9 disposed substantially parallel to the pane 30 the surface engaging portion 26 of the blade 24 will engage the pane and be held obliquely thereto by the flange 25. The yieldable shank 10 will enable the blade edge 26 to be held against the pane 30 with any desired pressure by positioning the handle 8 as illustrated in Figure 2 and so that the blade will yieldably bear thereagainst. As previously stated, the ends of the rods 13 which engage in the grooves 11 may be slidably adjusted relatively thereto and will be retained in various adjusted positions by the spring rings 15 to vary the distance between the handle 8 and the head 9 and accordingly the length of the exposed portion of the shank 10 and as a result the resiliency of said portion. By positioning the head 9 in substantially the same plane as the shank 10, said head may be readily inserted between overlapped portions of window sashes as illustrated in Figure 2 for engaging the portion of the pane 30 of one of said sashes and which is disposed behind an overlapping portion of the other sash.

By pressing the rod portions 17 toward one another the terminals 18 can be disengaged from the recesses 29 through openings 28 and the shank 10 connected to a head of a larger or smaller size.

To positively prevent accidental disengagement of the terminals 18 from recesses 29, a U-shaped rigid clip 31 is provided having relatively short legs 32 and which has an outwardly opening channel extending along the legs 32 and intermediate portion 33 of the clip. Clip 31 fits between rod portions 17 and with the leg channels engaging parts thereof as seen in Figure 1. When thus disposed, the ends of the channel of clip portion 33 engage the outturned rod portions 34. Legs 32 are made shorter than rod portions 17 and the corners of the channels are cut away as seen at 35 so that clip 31 can be rocked as seen in dotted lines in Figure 1 in a direction generally longitudinal of the shank 10 to disengage the clip from shank 10 so that head 9 can be detached or for applying the clip 31 to the shank 10. With clip 31 applied, the terminals 18 are non-detachably anchored to the head 9.

Various modifications and changes are contemplated and may obviously be resorted to, without departing from the spirit or scope of the invention as hereinafter defined by the appended claims.

I claim as my invention:

1. In a wiping implement of the character described, an elongated handle, an implement head having a wiper blade adapted for wiping engagement with a window pane or the like, a resilient shank connecting said head to one end of the handle and resiliently supporting the head relatively to the handle, and said implement head having socket means rigidly, detachably and non-turnably receiving one end of said shank whereby said head is detachably supported rigidly on said shank end and coplanar therewith.

2. In a wiping implement of the character described, an elongated handle, an implement head having a wiper blade adapted for wiping engagement with a windowpane or the like, a resilient shank connecting said head to one end of the handle and resiliently supporting the head relatively to the handle, and means rigidly connecting said head detachably to one end of the shank and with the head and said shank end disposed in the same plane, said shank including a pair of resilient rods disposed parallel to the axis of the handle and in spaced relationship to one another, said rods having terminal portions at corresponding ends thereof disposed substantially parallel to the longitudinal axis of the shank and outwardly offset relatively to the remaining portions of said rods, and said head having an inner edge disposed adjacent the handle, said head being provided with internal recesses opening outwardly of said inner edge and detachably receiving said outwardly offset terminal portions to detachably mount the head rigidly on said shank.

3. In a wiping implement of the character described, an elongated handle, an implement head having a wiper blade adapted for wiping engagement with a windowpane or the like, a resilient shank connecting said head to one end of the handle and resiliently supporting the head relatively to the handle, and means rigidly connecting said head detachably to one end of the shank and with the head and said shank end disposed in the same plane, said shank including a pair of resilient rods disposed parallel to the axis of the handle and in spaced relationship to one another, said rods having terminal portions at corresponding ends thereof disposed substantially parallel to the longitudinal axis of the shank and outwardly offset relatively to the remaining portions of said rods, and said head having spaced internal recesses, said head having an inner edge disposed adjacent the handle provided with spaced openings communicating with adjacent ends of the internal recesses through which the outwardly offset terminals are movable into and out of engagement with the internal recesses when said terminals are displaced toward one another, and the resiliency of the rods normally retaining the outwardly offset terminals in outwardly spaced relationship to said openings and out of registry therewith to detachably secure the head to the shank.

JOHN J. MACKERT.

References Cited in the file of this patent

UNITED STATES PATENTS

| Number | Name | Date |
|---|---|---|
| 394,069 | Fortin | Dec. 4, 1888 |
| 586,857 | Matthews | July 20, 1897 |
| 592,076 | Brown | Oct. 19, 1897 |
| 598,008 | Putman | Jan. 25, 1898 |
| 948,641 | Bailey | Feb. 8, 1910 |
| 1,073,612 | Lockhart | Sept. 23, 1913 |
| 1,108,475 | Roland | Aug. 25, 1914 |
| 1,315,900 | Allen | Sept. 9, 1919 |
| 1,370,910 | Pederson | Mar. 8, 1921 |
| 1,378,243 | Kracke | May 17, 1921 |
| 1,395,652 | Motter | Nov. 1, 1921 |
| 1,395,863 | Nelson | Nov. 1, 1921 |
| 1,503,062 | Pendergast | July 29, 1924 |
| 1,521,737 | Washburn | Jan. 6, 1925 |
| 1,840,023 | Couture | Jan. 5, 1932 |
| 1,929,848 | Neely | Oct. 10, 1933 |
| 1,964,134 | Oberti | June 26, 1934 |
| 2,014,602 | Nilson | Sept. 17, 1935 |
| 2,134,301 | Guggenbuehler | Oct. 25, 1938 |
| 2,191,642 | Carvalho | Feb. 27, 1940 |
| 2,310,011 | Cave | Feb. 2, 1943 |
| 2,389,322 | Olsen | Nov. 20, 1945 |